US012735922B2

(12) United States Patent
Yu

(10) Patent No.: US 12,735,922 B2
(45) Date of Patent: Sep. 15, 2026

(54) HANDLE ASSEMBLY

(71) Applicant: Illinois Tool Works Inc., Glenview, IL (US)

(72) Inventor: Gang Yu, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 19 days.

(21) Appl. No.: 18/668,998

(22) Filed: May 20, 2024

(65) Prior Publication Data

US 2024/0392616 A1 Nov. 28, 2024

(30) Foreign Application Priority Data

May 25, 2023 (CN) ......................... 202310601777.2
Apr. 26, 2024 (CN) ......................... 202410516866.1

(51) Int. Cl.
*E05B 85/10* (2014.01)
*E05B 81/76* (2014.01)

(52) U.S. Cl.
CPC ............ *E05B 85/103* (2013.01); *E05B 81/77* (2013.01)

(58) Field of Classification Search
CPC ....... E05B 85/10; E05B 85/103; E05B 85/107
See application file for complete search history.

(56) References Cited

U.S. PATENT DOCUMENTS 9,458,649 B2 * 10/2016 Fujiwara ................. E05B 81/56
11,643,856 B2 * 5/2023 Jeong .................... E05B 85/107 292/336.3
11,649,659 B2 * 5/2023 Chen ..................... E05B 85/103 292/336.3
11,851,920 B2 * 12/2023 Peterson ................. E05B 81/06
2016/0208523 A1 * 7/2016 Bingle .................... E05B 85/10
2019/0078360 A1 3/2019 Blount
2019/0234121 A1 * 8/2019 Pudney ................. E05B 85/103
2023/0258029 A1 * 8/2023 Philippe ................ E05B 85/103 70/277

FOREIGN PATENT DOCUMENTS

CN 108884695 A 11/2018
CN 113047711 A * 6/2021 ............. E05B 79/06
CN 113756666 A * 12/2021 ............. E05B 79/22
CN 216142581 U * 3/2022

(Continued)

*Primary Examiner* — Carlos Lugo

(74) *Attorney, Agent, or Firm* — McAndrews, Held & Malloy, Ltd.

(57) ABSTRACT

A handle assembly for a door having a handle aperture includes a housing, a cover plate and a transmission device. The transmission device can move the cover plate between a closed and open position in response to an electronic signal and, when the cover plate is in the closed position, moving it to the open position by a pushing force from outside. In the handle system, the cover plate is driven by the motor, thus the handle assembly can be electrically connected to the controller, and the cover plate can be automatically opened or closed by control of the controller. The transmission device allows the operator to press the cover plate from outside of the handle assembly to open the cover plate in case of emergency, thus the operator's hand can access the operating cavity for operation, thereby improving the reliability of the handle assembly.

19 Claims, 11 Drawing Sheets

(56) References Cited

FOREIGN PATENT DOCUMENTS

| | | | | | |
|---|---|---|---|---|---|
| CN | 115288534 | A | * | 11/2022 | ........... E05B 85/103 |
| DE | 19755138 | C2 | * | 6/2000 | ................ B60J 5/00 |
| DE | 102013016885 | A1 | * | 6/2014 | ............. E05B 81/76 |
| DE | 102020207532 | A1 | * | 12/2021 | ........... E05B 85/103 |
| WO | WO-2023231574 | A1 | * | 12/2023 | ............. E05B 81/06 |

* cited by examiner

A-A

B-B

C-C

HANDLE ASSEMBLY

RELATED APPLICATIONS

The present application claims the benefit of Chinese Patent Application Nos. 202310601777.2, filed May 25, 2023, and 202410516866.1, filed Apr. 26, 2024, each titled "Handle Assembly," the contents of which are hereby incorporated by reference.

TECHNICAL FIELD

The present disclosure relates to the field of vehicle parts, and in particular to a handle assembly for opening a vehicle door.

BACKGROUND

A handle assembly is provided on a sheet metal part of a vehicle door, and the vehicle door can be opened by means of the handle assembly. For some existing hidden door handle assemblies, the handle assembly is configured to be substantially flush with the door sheet metal part when the handle assembly is not in use, so that the handle assembly can be visually hidden in the door sheet metal part, achieving a more artistic appearance. When the handle assembly is needed, the handle assembly is then moved to an open position to expose a cavity for an operator to operate, so as to facilitate the operator to open the vehicle door.

SUMMARY

The present disclosure relates generally to a handle assembly, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1A:
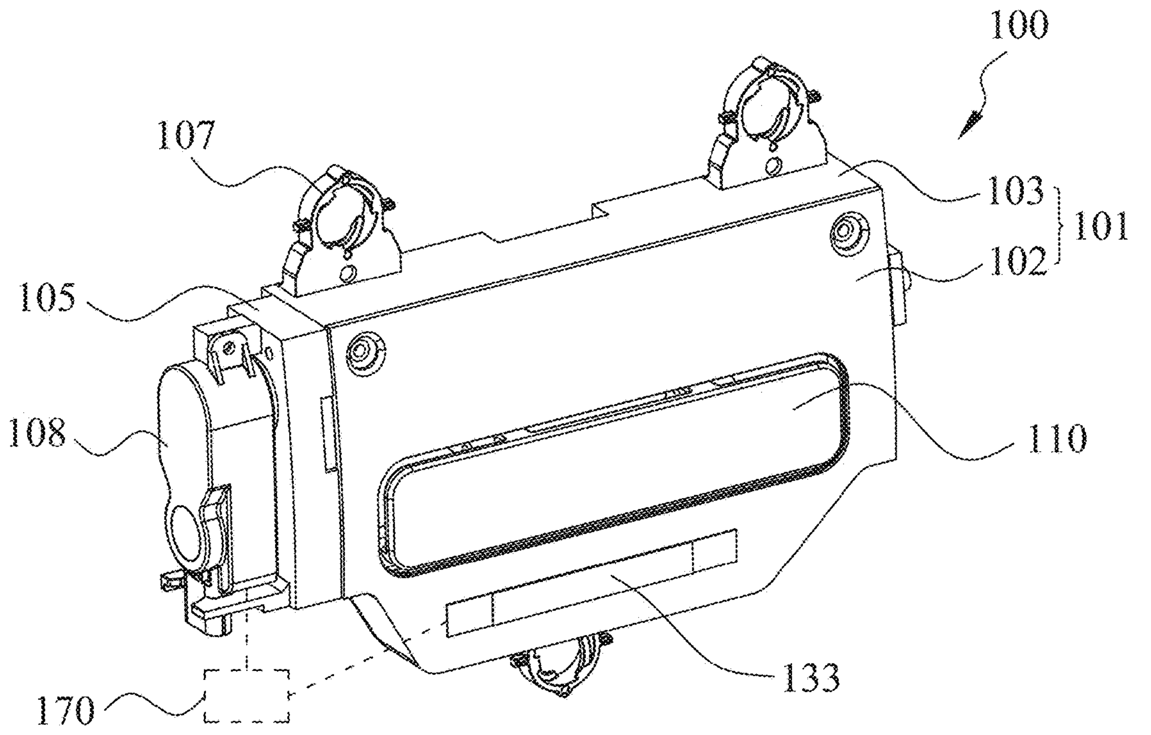
FIG. 1A is a perspective view of a structure of a handle system according to an example of the present disclosure from one perspective.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The present disclosure provides a handle assembly for a door having a handle aperture, including a housing, a cover plate and a transmission device. The housing defines a cavity and has a housing opening in communication with the cavity, and the housing opening is configured to be aligned with the handle aperture of the door. The cover plate has a closed position and an open position, and the cover plate is configured to close the handle aperture of the door in the closed position and to open the handle aperture of the door in the open position. The transmission device is disposed in the housing and connected to the cover plate. The transmission device is configured to be capable of moving the cover plate between the closed position and the open position in response to an electronic signal and, when the cover plate is in the closed position, moving the cover plate to the open position by a pushing force from outside of the cover plate.

According to the above content, the transmission device includes a rotatable rotating shaft being capable of rotating in response to an electronic signal or a mechanical force and at least one connecting member, and one end of the at least one connecting member is connected to the rotating shaft to rotate with the rotation of the rotating shaft, and the other end of the at least one connecting member is rigidly hinged to the cover plate to enable the rotating shaft to move the cover plate by means of the connecting member or enable the cover plate to rotate the rotating shaft by means of the connecting member. The handle assembly further includes a limiting structure disposed on the cover plate and a limiting fit structure disposed on the housing, and the limiting structure is engaged with the limiting fit structure. The transmission device, the limiting structure and the limiting fit structure enable the cover plate to move between the closed position and the open position.

According to the above content, the at least one connecting member is hinged to a top end of the cover plate to enable the top end of the cover plate to rotate circumferentially around the rotating shaft.

According to the above content, the limiting structure on the cover plate is disposed at the bottom of the cover plate.

According to the above content, the limiting structure includes a limiting pin disposed on at least one end of the cover plate in a left-right direction, and the limiting fit structure includes a track slot formed on a side wall of the housing, and the limiting pin is capable of sliding in the track slot.

According to the above content, the track slot is a straight slot, and the track slot extends obliquely upward in a front-rear direction.

According to the above content, the transmission device further includes a driving gear and a transmission gear meshing with each other, and the transmission gear is in transmission connection between the rotating shaft and the driving gear, so that the rotation of either of the driving gear and the rotating shaft is capable of driving the transmission gear to rotate, and in turn the transmission gear drives the other one of the rotating shaft and the driving gear to rotate. The driving gear and the transmission gear are configured such that, in response to an electronic signal, the driving gear is driven by a motor to rotate so as to rotate the transmission gear and in turn move the cover plate by means of the connecting member; and, in response to a pushing force from outside of the cover plate, the cover plate rotates the rotating shaft by means of the connecting member so as to rotate the transmission gear and in turn drive the driving gear to rotate.

According to the above content, the diameter of the driving gear is greater than the diameter of the transmission gear.

According to the above content, the cavity includes an accommodating cavity, a receiving channel and an operating cavity, wherein the receiving channel is located at a rear side of the housing opening, and the accommodating cavity and the operating cavity are respectively located at the opposite upper side and lower side of the receiving channel and interconnected to each other through the receiving channel. The accommodating cavity of the housing is configured to accommodate the cover plate when the cover plate is in the open position, and the operating cavity of the housing is configured to at least partially accommodate an operator's hand for opening the door.

According to the above content, the handle assembly further includes an operating element including a sensing device, and the sensing device is configured to detect the operator's hand and to send a signal.

According to the above content, the sensing device is disposed on a side wall of the housing close to the housing opening to allow the operator's hand to access the operating cavity from the housing opening through the receiving channel so as to be detected by the sensing device.

Other objectives and advantages of the present disclosure will be apparent from the following description of the present disclosure with reference to the drawings, which can facilitate the comprehensive understanding of the present disclosure.

Figure 1B:
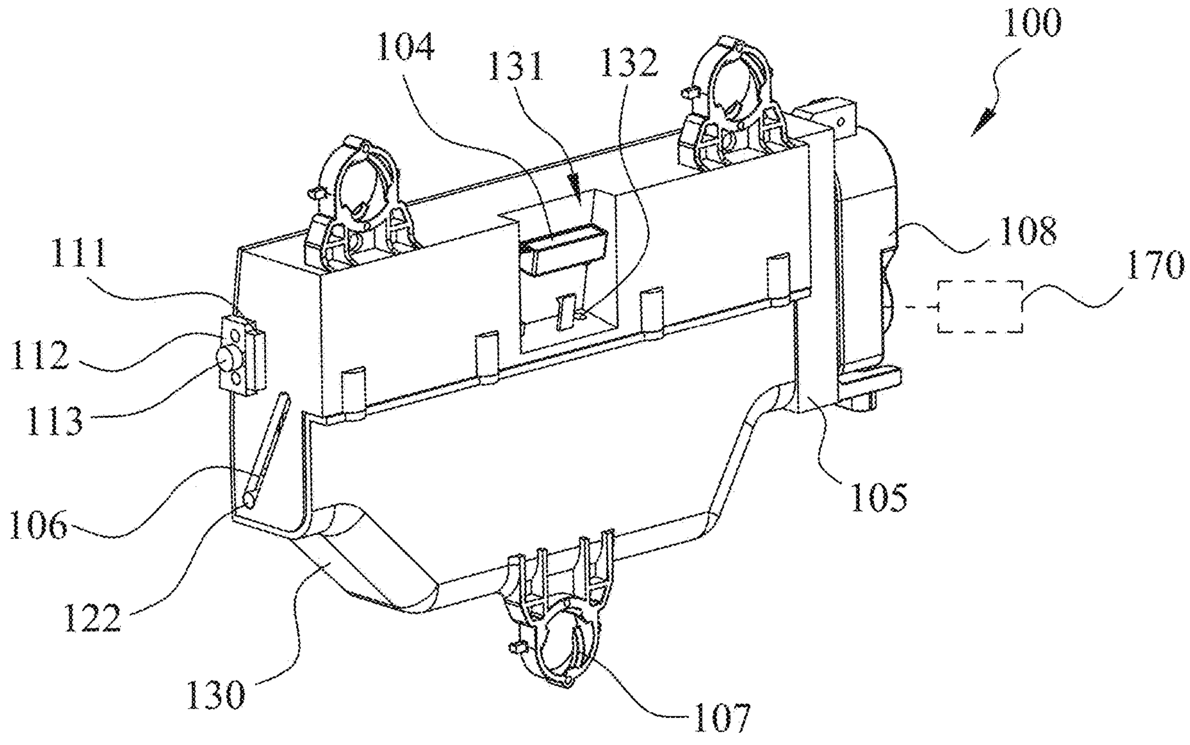
FIG. 1B is a perspective view of a structure of the handle system shown in FIG. 1A from another perspective.
Figure 1C:
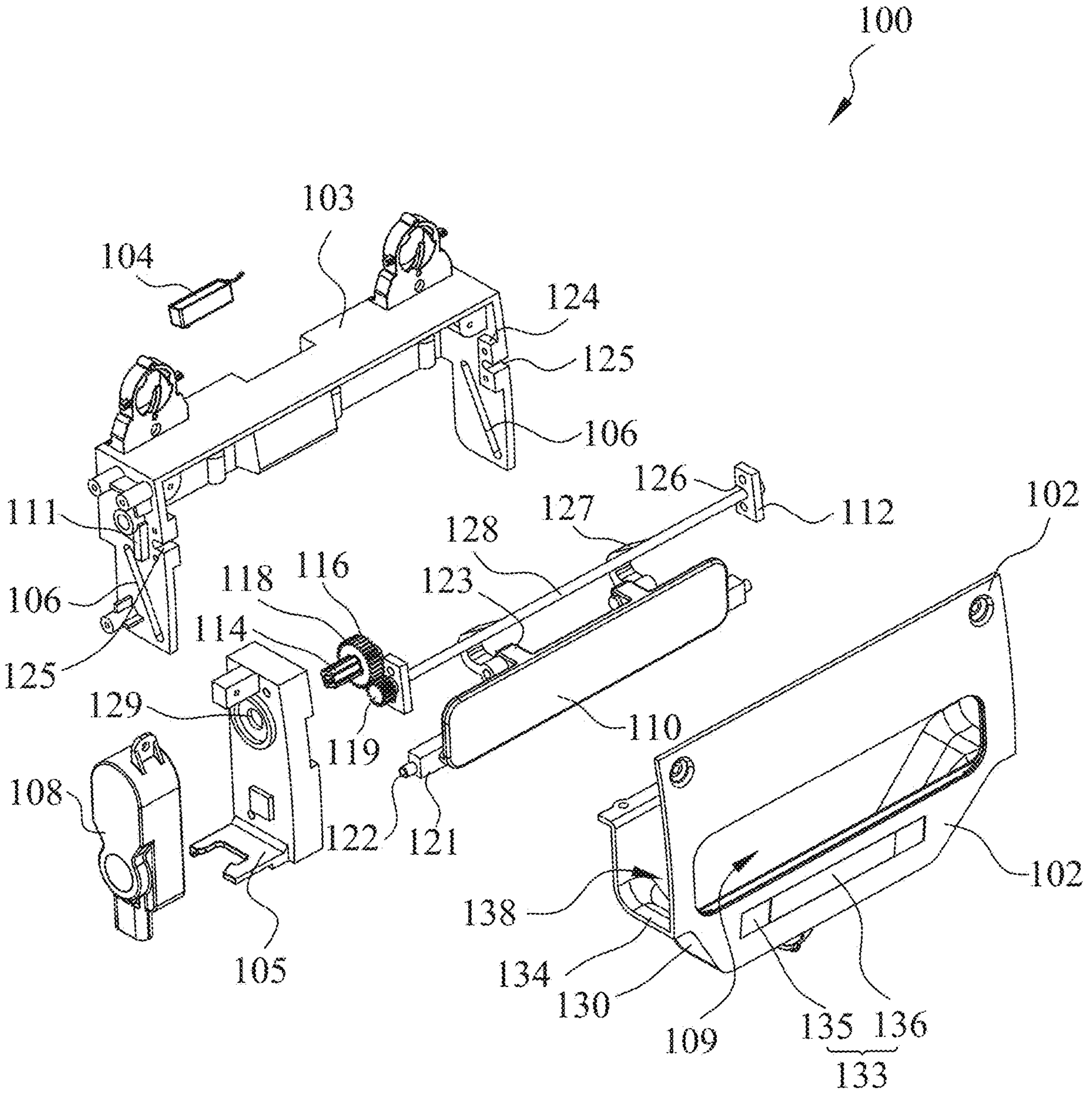
FIG. 1C is an exploded view of the handle assembly shown in FIG. 1A from one perspective.
Figure 1D:
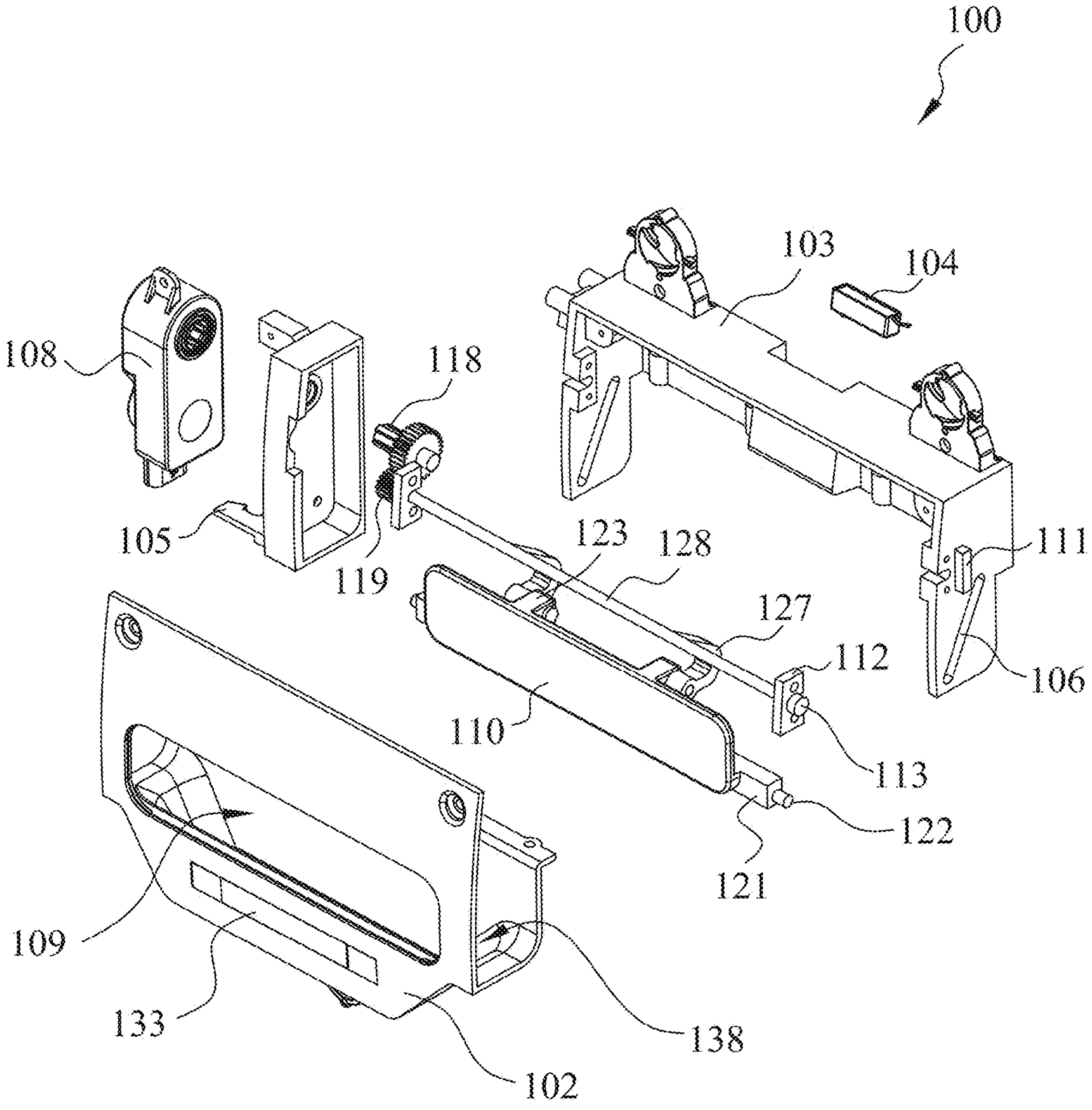
FIG. 1D is an exploded view of the handle assembly shown in FIG. 1A from another perspective.

FIGS. 1A to 1D show a general structure of a handle system according to an example of the present disclosure. The handle system includes a handle assembly 100 and a controller 170, and the handle assembly 100 is communicatively connected to the controller 170. The handle assembly 100 is configured to be mounted to a door of a vehicle, and specifically onto an inner side of the door having a handle aperture. FIG. 1A shows a perspective view of a structure of the handle assembly 100 in the handle system from a front-rear perspective, FIG. 1B shows a perspective view of a structure of the handle assembly 100 in the handle system from a rear-front perspective, FIGS. 1A and 1B are intended to illustrate the external structure of the handle assembly 100, and in the handle assembly 100 shown in FIG. 1B, a lamp 104 is removed from a first housing 103. FIG. 1C shows an exploded view of the handle assembly 100 as viewed from the left front, FIG. 1D shows an exploded view of the handle assembly 100 as viewed from the right front, and FIGS. 1C and 1D are intended to illustrate the internal structure of the handle assembly 100. As shown in FIGS. 1A to 1D, the handle assembly 100 includes a substantially square box-shaped housing 101 and a cover plate 110. A front side wall of the housing 101 is provided with a housing opening 109 aligned with the handle aperture of the door. The cover plate 110 has an open position and a closed position, and the cover plate 110 can open the handle aperture and the housing opening 109 in the open position and close the handle aperture and the housing opening 109 in the closed position. A motor 108 and a motor frame 105 are provided on one side of the housing 101 (i.e., the left side in FIG. 1A), and the motor 108 is connected to the housing 101 by means of the motor frame 105. The motor 108 is communicatively connected to the controller 170. The motor 108 drives the cover plate 110 to move between the open position and the closed position by means of a transmission device disposed inside the housing 101.

Further, as shown in FIGS. 1C and 1D, the housing 101 defines a cavity inside including an accommodating cavity 481, a receiving channel 482 (see FIG. 4B) and an operating cavity 138. The receiving channel 482 is located at a rear side of the housing opening 109, the accommodating cavity 481 and the operating cavity 138 are respectively located at an upper side and a lower side of the receiving channel 482, and the accommodating cavity 481 and the operating cavity 138 are interconnected to each other through the receiving channel 482. In this example, the accommodating cavity 481 is located at the upper side of the receiving channel 482, and the operating cavity 138 is located on the lower side of the receiving channel 482. In some other examples, the accommodating cavity may also be located at the lower side of the receiving channel, and the operating cavity is located at the upper side of the receiving channel. When the cover plate 110 is in the closed position, the cover plate 110 is located in the housing opening 109 (see FIG. 4B). When the cover plate 110 is in the open position, the cover plate 110 is located in the accommodating cavity 481, and the operating cavity 138 is exposed through the housing opening 109 (see FIG. 6B). Then, an operator's hand can access the operating cavity 138 from the handle aperture and the housing opening 109. The operating cavity 138 may at least partially accommodate the operator's hand (e.g., fingers). In this way, after the cover plate 110 is opened, the cover plate 110 does not hinder the operator's hand from operating in the operating cavity 138, so as to prevent the cover plate 110 from hitting the operator's hand.

In the example as shown in FIGS. 1A to 1D, the housing 101 includes a first housing 103 and a second housing 102 detachably connected to each other, and the first housing 103 and the second housing 102 are connected to each other by means of a fastening structure, for example, by means of bolts. The first housing 103 forms a top wall, a left side wall, a right side wall, and part of a rear side wall of the square box-shaped housing 101, and the second housing 102 forms a bottom wall, a front side wall, and the other part of the rear side wall of the square box-shaped housing 101. In this example, the housing opening 109 is formed on the front side wall of the second housing 102, and the operating cavity 138 is defined by the second housing 102. Specifically, the second housing 102 further includes a pair of bottom side walls 130, and the bottom side walls 130 are respectively formed by extending upward from a left side edge and a right side edge of the bottom wall of the second housing 102. The pair of bottom side walls 130 are further provided with fold-over edges 134 on the top, and the fold-over edges 134 abut with the left side wall and the right side wall of the first housing 103. The bottom side wall 130, the bottom wall, the front side wall, and the rear side wall of the second housing 102 jointly define the operating cavity 138. In this example, the pair of bottom side walls 130 extend obliquely relative to each other from top to bottom, so that the operating cavity 138 has a bottom smaller than its top. The operating cavity 138 having a bottom smaller than its top can be more convenient for the operator to perform blind operations. The left side wall and the right side wall of the first housing 103 and the rear side wall of the second housing 102 jointly define the receiving channel 482. The front side wall of the first housing 103 and the front side wall of the second housing 102 jointly define the accommodating cavity 481. When the cover plate 110 is moved to the open position, the cover plate 110 can enter into the accommodating cavity 481 and is completely hidden by the front side wall of the second housing 102.

The handle assembly 100 further includes an operating element for the operator's hand to operate. In this example, the operating element includes a sensing device 133 being communicatively connected to the controller 170. The sensing device 133 is configured to detect the operator's hand and to send a corresponding signal to the controller 170. In this example, the sensing device 133 is disposed at an outer side of the front side wall of the second housing 102 to allow the operator's hand to be detected by the sensing device 133 when the hand accesses the operating cavity 138. In other examples, the sensing device 133 may also be disposed on the other side wall of the housing 101 close to the housing opening 109, for example, at the inner side of the front side wall of the second housing 102, to allow the operator's hand to be detected by the sensing device 133 when the hand accesses the operating cavity 138. Also, in this example, the sensing device 133 includes an ultrasonic sensor 135 and an ultrasonic sensor 136 disposed in a stacked way. The ultrasonic sensor 136 is disposed at an outer side of the ultrasonic sensor 135. For example, the ultrasonic sensor 136 is configured to send an external control signal to the controller 170 in response to the operator's hand being within a predetermined distance outside the handle assembly 100. In addition, the ultrasonic sensor 135 is configured to send an internal control signal to the controller 170 in response to the operator's hand being inside the operating cavity 138. In some examples, the ultrasonic sensor may also be sized such that the ultrasonic sensor has detection regions of different sizes. For example, the length of the ultrasonic sensor 136 is less than the length of the ultrasonic sensor 135, and the ultrasonic sensor 136 is located in the middle of the ultrasonic sensor 135, so that the operator's hand inside the operating cavity 138 corresponds to a larger detection region than the operator's hand outside the door. For the operator, the operator's view is obstructed when the operator's hand accesses the operating cavity 138, and the larger detection region facilitates blind operations by the operator. Since the ultrasonic sensor has the characteristic of penetrating metal and plastic materials and can detect the operator's hand based on an ultrasonic signal, the operator does not need to directly touch the ultrasonic sensor. Thus, even if the ultrasonic sensor is disposed on the handle assembly 100 inside the door, the operator's hand outside the door or inside the operating cavity 138 can still be detected, so that there is no need to provide an additional sensor on the door, making the door have a flatter and more artistic appearance. In some other examples, the sensing device 133 may further include capacitive sensors that detect the operator's hand by means of the operator's touch operations. The capacitive sensors may be respectively disposed outside the door and inside the operating cavity for the operator to perform contact operations. In some examples, the capacitive sensor outside the door is configured to send an external control signal to the controller 170 in response to the operator's hand being within a predetermined distance outside the handle assembly 100. In addition, the capacitive sensor inside the operating cavity is configured to send an internal control signal to the controller 170 in response to the operator's hand being inside the operating cavity 138.

The transmission device of the handle assembly 100 is in transmission connection with the motor 108 and the cover plate 110, so that the cover plate 110 can be driven by the motor 108 to move between the open position and the closed position. Alternatively, the cover plate 110 in the closed position is moved to the open position under the action of a pushing force from outside of the cover plate 110. Specifically, the transmission device includes a driving gear 118, a transmission gear 119, a rotating shaft 128 and at least one connecting member 127. The transmission gear 119 is in transmission connection between the driving gear 118 and the rotating shaft 128, and the connecting member 127 rigidly connects the rotating shaft 128 and the cover plate 110. The driving gear 118 is connected to the outer side of the left side wall of the first housing 103, and is engaged with the motor 108 to receive the driving force of the motor 108 and rotate, or to drive the motor 108 to reverse. In this example, the driving gear 118 includes a toothed portion 116 and a power receiving portion 114 that protrudes outward in an axial direction of the driving gear 118. The power receiving portion 114 passes through a hole 129 in the motor frame 105 and engages the motor 108 to drive the toothed portion 116 to rotate.

The transmission gear 119 is also connected to the outer side of the left side wall of the first housing 103, and is disposed side-by-side with the driving gear 118 on the front side of the driving gear 118. The transmission gear 119 meshes with the toothed portion 116 of the driving gear 118 to enable the driving gear 118 and the transmission gear 119 to drive each other. The rotating shaft 128 extends horizontally in a left-right direction, and a left end of the rotating shaft 128 is fixedly connected to the transmission gear 119 to enable the transmission gear 119 and the rotating shaft 128 to move with each other. A right end of the rotating shaft 128 is rotatably supported on the right side wall of the first housing 103. The at least one connecting member 127 is in the middle of the rotating shaft 128, the connecting member 127 is fixedly connected to the rotating shaft 128 and is rigidly hinged to the cover plate 110, so that the rotation of the rotating shaft 128 can rotate the connecting member 127 and in turn move the cover plate 110. The cover plate 110 and the rotating shaft 128 are hinged by the connecting member 127, so that the rotating shaft 128 can move the cover plate 110, and the cover plate 110 can also rotate the rotating shaft 128. Thus, the driving gear 118, which is driven by the motor 108 to rotate, can rotate the rotating shaft 128 by means of the transmission gear 119 and in turn move the cover plate 110. When the cover plate 110 is subjected to a pushing force from outside, the cover plate 110 can rotate the rotating shaft 128 and, by means of the transmission gear 119 and the driving gear 118, push the motor 108 to reverse.

In this example, that diameter of the transmission gear 119 is less than the diameter of the driving gear 118, so that the rotation speed of the rotating shaft 128 is greater than the rotation speed of the driving gear 118. Compared with a transmission device that directly connects the driving gear 118 to the rotating shaft 128 and does not include the transmission gear 119, under the premise that the driving gear 118 has the same rotation speed, the transmission device of this example can make the handle assembly 100 open and close faster. In addition, in this example, by means of the transmission connection between the transmission gear 119 and the driving gear 118, the position of rotation center of the rotating shaft 128 in the thickness direction of the handle (i.e., in the front-rear direction) is changed, so that the rotating shaft 128 is disposed close to the front side wall of the housing 101, thereby reducing the thickness of the handle assembly.

The handle assembly 100 further includes a limiting structure disposed on the cover plate 110 and a limiting fit structure disposed on the housing 101, and the limiting structure is engaged with the limiting fit structure. The arrangement of the limiting structure and the limiting fit structure engaged with each other can control the movement track of the cover plate 110 when the connecting member 127 moves the cover plate 110. In this example, the limiting structure includes a limiting pin 122, and the limiting pin 122 is disposed on at least one end of the cover plate 110 in the left-right direction and close to the bottom of the cover plate 110. The limiting fit structure includes a track slot 106 disposed on a corresponding position on the left side wall and/or the right side wall of the first housing 101. The limiting pin 122 can fit with the track slot 106 and slide in the corresponding track slot 106, thereby limiting the movement track of the cover plate 110, but the track slot 106 does not limit the rotation of the limiting pin 122. The track slot 106 is in the shape of an inclined straight slot, and the track slot 106 extends obliquely upward in the front-rear direction. When the operator pushes the cover plate 110 from outside of the cover plate 110, the straight slot-shaped track slot 106 facilitates movement of the cover plate 110 toward the accommodating cavity 481 through the receiving channel 482. In this example, the connecting member 127 is hinged to the top of the cover plate 110, and the limiting pin 122, which fits with the track slot 106, is disposed at the bottom of the cover plate 110. Thus, the connecting member 127 drives the cover plate 110 to move, and the limiting pin 122 and the track slot 106 can limit the movement track of the cover plate 110. It will be appreciated by those skilled in the art that the limiting structure and the limiting fit structure may also be configured as other fit structures as long as the movement track of the cover plate 110 can be controlled.

In this example, the at least one connecting member 127 includes a pair of connecting members 127. A pair of connecting blocks 123 are symmetrically disposed side-by-side at the left side and the right side of the top of the cover plate 110. The pair of connecting members 127 are each hinged to one connecting block 123. Also, in this example, a left end and a right end of the cover plate 110 are each connected to a support block 121, and an outwardly protruding limiting pin 122 is disposed on an end surface of an outer side of each support block 121. The track slots 106 are formed at corresponding positions on the left side wall and the right side wall of the first housing 103. This arrangement makes the cover plate 110 receive force evenly and thus move more smoothly. The more specific structure of the transmission device will be described in detail with reference to FIGS. 2A and 2B.

In this example, the handle assembly 100 further includes a pair of blocking pieces 112, a snap cap 113 and a pair of limiting blocks 111, which are used for fixing both ends of the rotating shaft 128, so that the rotating shaft 128 is only capable of rotational movement without displacement in other directions. Specifically, the pair of blocking pieces 112 are disposed on the left end and the right end of the rotating shaft 128. Slots 125 are formed on the left side wall and the right side wall of the first housing 103, slots 126 are formed on the pair of blocking pieces 112, the openings of the slots 125 are opposite to the openings of the slots 126, and the slots 125 and the slots 126 are sized to match the ends of the rotating shaft 128. In this example, the slot 125 is shaped to have a front side opening recessed backward from the front end surface of the left side wall and the front end surface of the rear side wall of the first housing 103, and the slot 126 is shaped to have a rear side opening recessed forward from the rear end surface of the blocking piece 112. When the pair of blocking pieces 112 are respectively connected to the left side wall and the right side wall of the first housing 103, the left end and the right end of the rotating shaft 128 can be held between the bottom of the slot 125 and the bottom of the slot 126, so that the rotating shaft 128 cannot be displaced in the front-rear direction but does not affect the rotation of the rotating shaft 128.

In this example, the pair of blocking pieces 112 and the pair of limiting blocks 111 are respectively connected to the outer side of the left side wall and the outer side of the right side wall of the first housing 103. Also, the pair of limiting blocks 111 are located at the rear sides of the corresponding blocking pieces 112 to limit the positions of the blocking pieces 112 so as to facilitate connection of the blocking pieces 112 to the left side wall and the rear side wall of the first housing 103. In this example, the blocking pieces 112 are connected to the first housing 103 by means of fastening, for example, by means of bolts. Due to the limited thickness of the left side wall and the right side wall of the first housing 103, in order to strengthen the connection of the blocking pieces 112 to the first housing 103, inwardly protruding bumps 124 are respectively provided on the left side wall and the right side wall of the first housing 103. The bumps 124 are located at the connections of the blocking pieces 112 and are integrally formed with the corresponding side walls of the first housing 103. The slots 125 are respectively formed by the bumps 124 and the respective side walls of the first housing 103.

The transmission gear 119 is fixedly connected to the left end of the rotating shaft 128 and is located at the outer side of the blocking piece 112 at the left side. The snap cap 113 is fixedly connected to the right end of the rotating shaft 128 and is located at the outer side of the blocking piece 112 at the right side. That is, when the rotating shaft 128 is supported between the slots 125 and the slots 126, the transmission gear 119 and the snap cap 113 jointly define the position of the rotating shaft 128 in the left-right direction, so that the rotating shaft 128 cannot be displaced in the left-right direction. Thus, when the transmission gear 119 drives the rotating shaft 128 to rotate, the rotating shaft 128 cannot undergo displacement motions other than rotation.

In addition, in this example, the handle assembly 100 further includes at least one positioning member 107, and the positioning member 107 is configured to be connected to a positioning structure (not shown in the figures) on the door to position and connect the handle assembly 100 to the inside sheet metal part of the door. In other examples, the handle assembly may also be connected to the door in other ways. As a specific example, the handle assembly 100 includes three positioning members 107, two of which are connected above the left side and the right side of the top wall of the first housing 103, and one of which positioning member 107 is connected below the middle of the bottom wall of the second housing 102. Thus, the handle assembly 100 can be connected to the door substantially by means of triangular positioning.

Also, the handle assembly 100 further includes a lamp 104. In this example, the lamp 104 is connected in a slot 131 in the rear side wall of the first housing 103. The slot 131 extends forward from the rear side wall of the first housing 103 into the accommodating cavity 481 (see FIG. 4B) and protrudes inward. A hole 132 is formed at the bottom of the slot 131, the lamp 104 is electrically connected to a central control or a controller 170 of the vehicle and controllably emits light toward the operating cavity 138 through the hole 132, so as to facilitate the operator to operate the handle assembly 100.

Figure 2A:
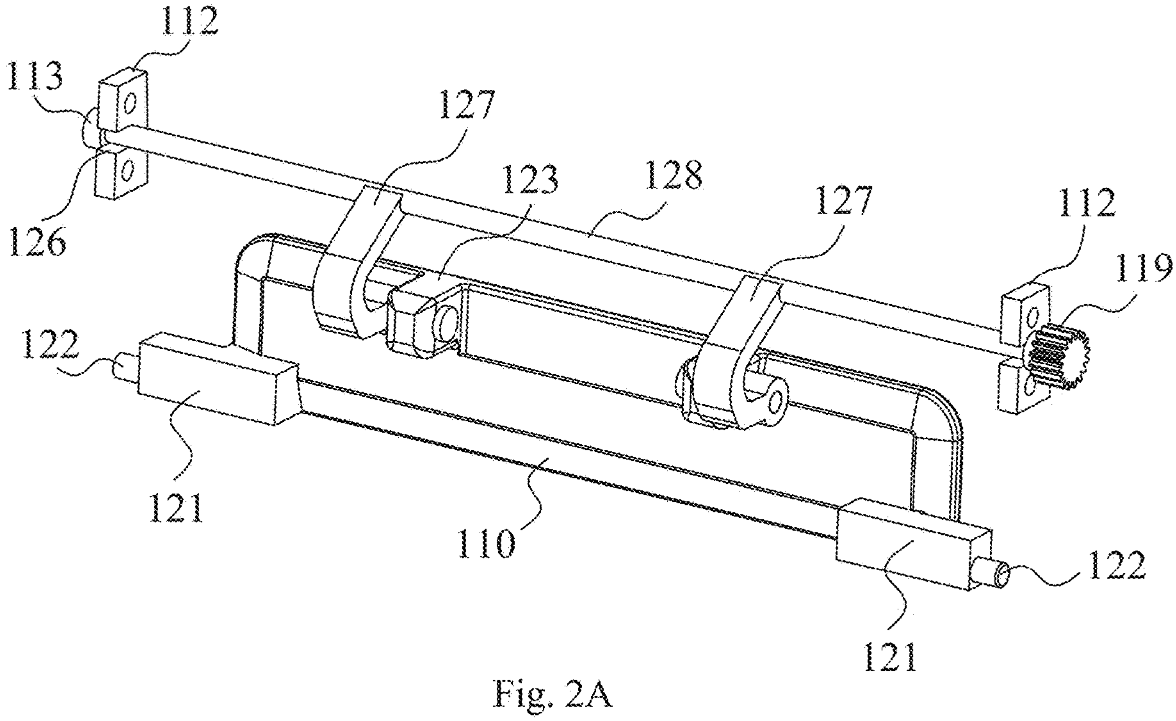
FIG. 2A is a perspective view of a structure of a transmission device and a cover plate shown in FIG. 1A from one perspective.
Figure 2B:
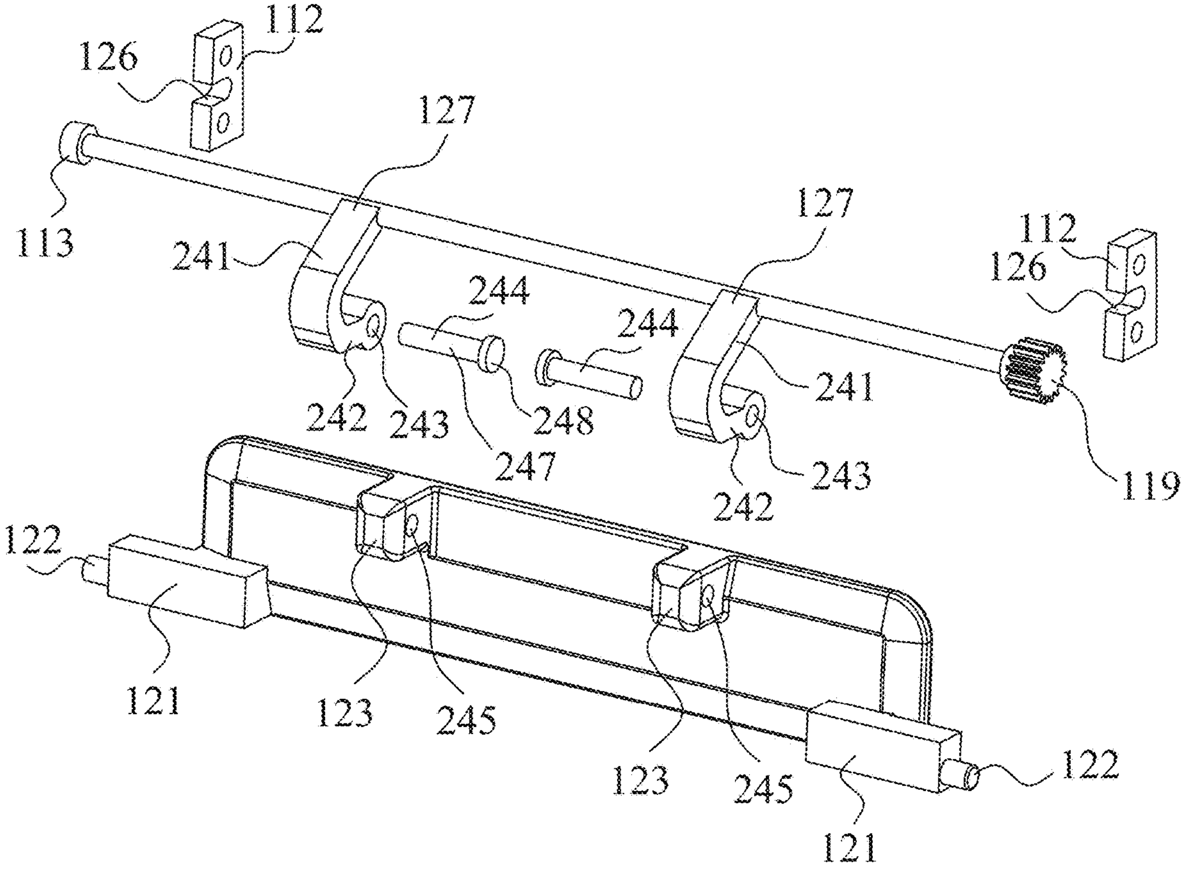
FIG. 2B is an exploded view of FIG. 2A.

FIGS. 2A and 2B show the specific structure of the transmission device. FIG. 2A shows a perspective view of a structure of the transmission device from a rear-front perspective, and FIG. 2B shows an exploded view of FIG. 2A. As shown in FIGS. 2A and 2B, the connecting member 127 is in the shape of a backwardly bent gooseneck including a shank portion 241 and hook portion 242 formed integrally. The connecting member 127 extends downward and backward from its top end to form the shank portion 241, and is then bent forward to form the hook portion 242. The shank portion 241 is connected to the hook portion 242 substantially at an acute angle. In this example, the connecting member 127 is made of a rigid material, and the shank portion 241 and the hook portion 242 are formed by bending. The gooseneck-shaped connecting member 127 can minimize the size of the handle assembly, especially in the height and thickness directions. Also, the gooseneck-shaped connecting member 127 can make full use of the space of the accommodating cavity 481 when the cover plate 110 is in the open position and keep away from the protrusion formed by the slot 131 of the first housing 103 protruding into the accommodating cavity 481 (see FIG. 6B). In other examples, the shank portion 241 and the hook portion 242 may also be connected together in other ways.

The top end of the shank portion 241 is fixedly connected to the rotating shaft 128, and the front end of the hook portion 242 has a hole 243 extending in the axial direction of the rotating shaft 128. Accordingly, each connecting block 123 of the cover plate 110 is also provided with a hole 245 extending in the axial direction of the rotating shaft 128. The transmission device further includes a pair of pins 244, and each pin 244 respectively passes through the hole 245 of the connecting block 123 and the hole 243 of the connecting member 127 to hinge the connecting member 127 to the connecting block 123. In this example, the connecting member 127 is connected to the outer side of the respective connecting block 123, and the pin 244 successively passes through the connecting block 123 and the connecting member 127 from the inside to the outside. The holes 245 and the holes 243 are sized to match stems 247 of the pins 244, and the inner end 248 of each pin 244 is sized to be larger than the hole 245 and the hole 243, so as to prevent the pins 244 from disengaging from the holes 245 and the holes 243. Thus, while the connecting member 127 is connected to the connecting block 123 by means of the pin 244, the connecting member 127 can also rotate relative to the connecting block 123.

The lengthwise direction of the cover plate 110 is consistent with the axial direction of the rotating shaft 128. In the lengthwise direction of the cover plate 110, that is, in the left-right direction of the handle assembly 100, two support blocks 121 are disposed on the left end and the right end of the cover plate 110. The two connecting blocks 123 are spaced apart between the two support blocks 121. Also, the support blocks 121 are disposed at the top of the cover plate 110, and the connecting blocks 123 are disposed at the bottom of the cover plate 110. As a specific example, two connecting blocks 123 are disposed substantially at one-third and two-thirds of the length of the cover plate 110. This arrangement can make the cover plate 110 receive force more evenly and thus move more stably. It will be appreciated by those skilled in the art that in other examples, the limiting pin 122 may also be connected to other parts of the cover plate 110 in other ways as long as the limiting pin 122 can fit with the correspondingly disposed track slot 106 to limit the sliding. It will be appreciated by those skilled in the art that the connecting blocks 123 are provided to facilitate the hinge of the cover plate 110 to the connecting members 127, and in cover plates of other shapes and structures, there may be no connecting block, or the connecting blocks may be disposed at other positions, or other numbers of connecting blocks may be provided.

In the present disclosure, as the rotating shaft 128 rotates, the connecting member 127 rotates accordingly to apply a pulling force to the top of the cover plate 110. Since the rotating shaft 128 cannot be displaced, the connecting members 127 and the connecting blocks 123 on the top end of the cover plate 110 all move clockwise circumferentially around the rotating shaft 128 as the rotating shaft 128 rotates. The bottom end of the cover plate 110 limits its movement by means of the limiting pin 122 and the track slot 106, so as to jointly move the cover plate 110 between the closed position and the open position.

Figure 3A:
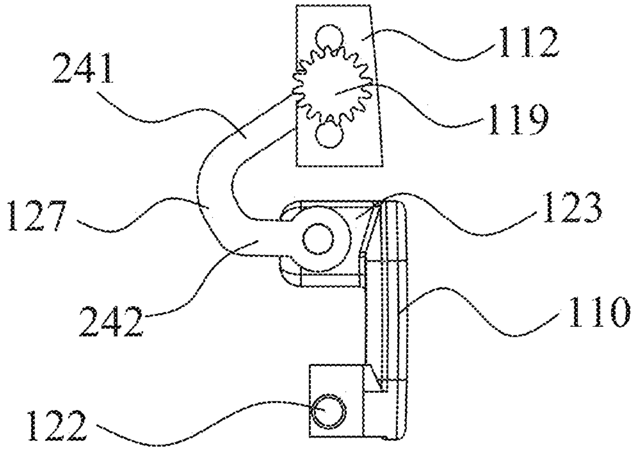
FIG. 3A is a side view of the transmission device and the cover plate when the cover plate is in a closed position.
Figure 3B:
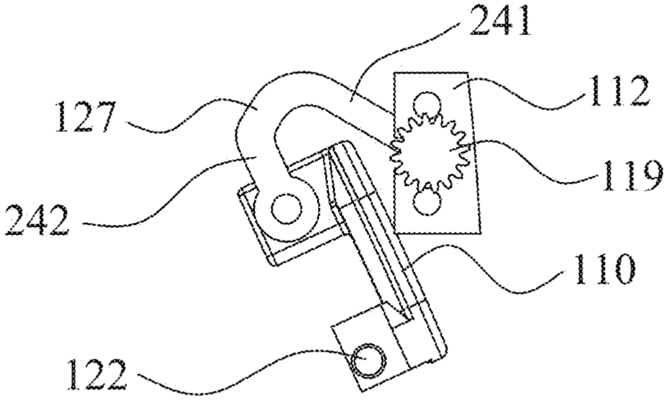
FIG. 3B is a side view of the transmission device and the cover plate when the cover plate is in an intermediate position.
Figure 3C:
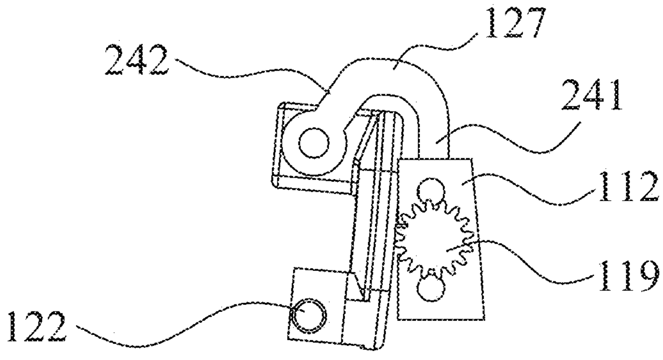
FIG. 3C is a side view of the transmission device and the cover plate when the cover plate is in an open position.

FIGS. 3A to 3C show the fit structure of the transmission device when the cover plate 110 is in different positions. FIG. 3A shows a left view of the transmission device when the cover plate 110 is in the closed position. FIG. 3B shows a left view of the transmission device when the cover plate 110 is in an intermediate position. FIG. 3C shows a left view of the transmission device when the cover plate 110 is in the open position. As shown in FIGS. 3A to 3C, during the movement of the cover plate 110 from the closed position to the open position, the transmission gear 119 rotates clockwise to rotate the rotating shaft 128 and the connecting member 127 clockwise.

When the cover plate 110 is in the closed position as shown in FIG. 3A, the cover plate 110 is substantially in a vertical state. The connecting block 123 on the top end of the cover plate 110 is on the lowermost end of the circumference. As the connecting member 127 rotates clockwise, the connecting member 127 applies an upward and leftward pulling force to the top end of the cover plate 110, and the limiting pin 122 rotates in the track slot 106 and moves to the upper left along the track slot 106 to move the cover plate 110 from the vertical state to the position shown in FIG. 3B.

When the cover plate 110 is in the intermediate position as shown in FIG. 3B, the cover plate 110 is substantially in a state with the top end tilted to the left. The connecting block 123 at the top end of the cover plate 110 rotates to the leftmost end of the circumference. As the connecting member 127 continues to rotate clockwise to pass over the position shown in FIG. 3B, the connecting member 127 applies an upward and rightward pulling force to the top end of the cover plate 110, and the limiting pin 122 rotates in the track slot 106 and continues to move to the upper left along the track slot 106 to move the cover plate 110 from a tilted state to the position shown in FIG. 3C.

When the cover plate 110 is in the open position as shown in FIG. 3C, the cover plate 110 is substantially in a vertical state. The connecting block 123 on the top end of the cover plate 110 rotates to the uppermost end of the circumference.

Figure 4A:
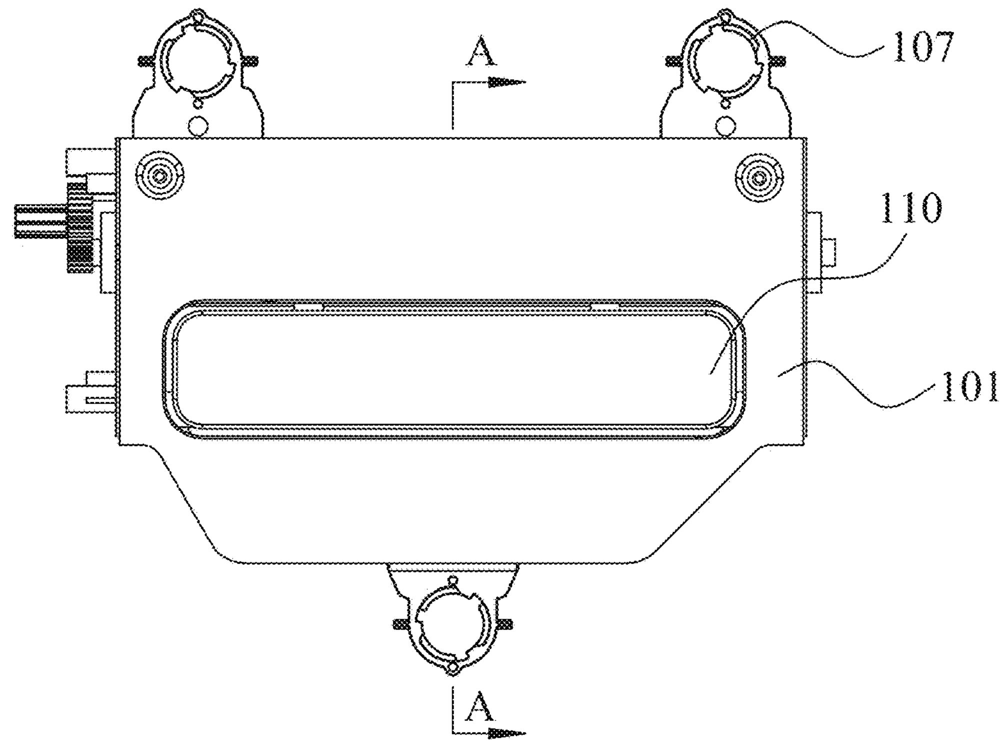
FIG. 4A is a front view of the handle assembly when the cover plate is in the closed position.
Figure 4B:
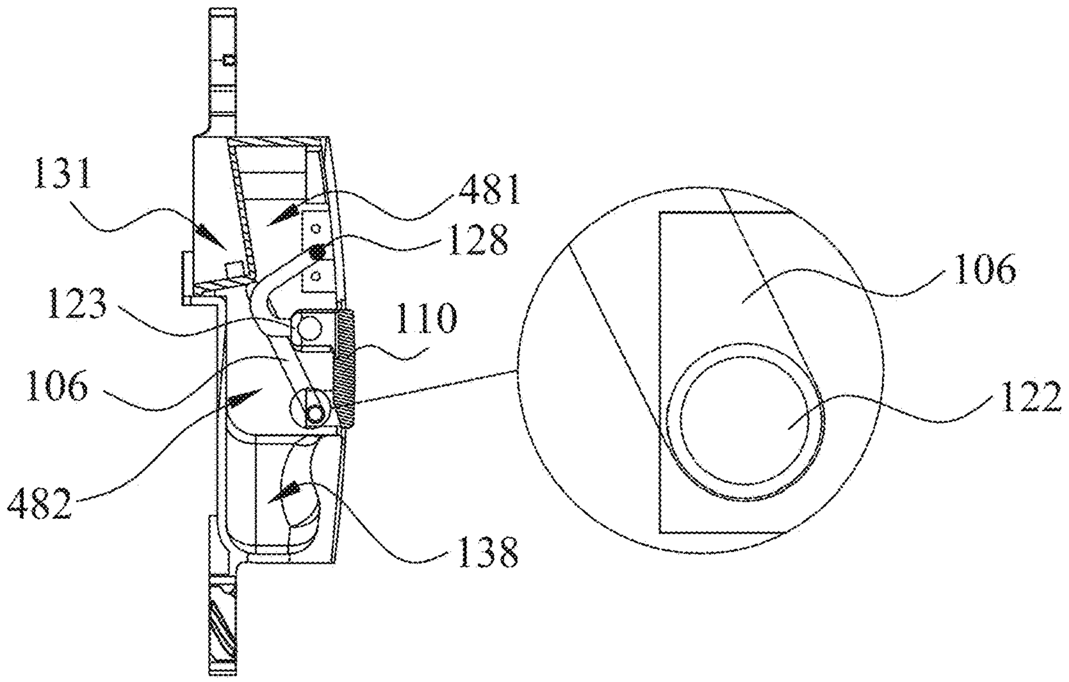
FIG. 4B is a cross-sectional view of the handle assembly shown in FIG. 4A taken along line A-A.

FIGS. 4A and 4B show the structure of the handle assembly 100 when the cover plate 110 is in the closed position. FIG. 4A shows a front view of the handle assembly 100, and FIG. 4B shows a cross-sectional view of the handle assembly 100 shown in FIG. 4A along line A-A, with a dashed circle showing a partial enlarged view. As shown in FIGS. 4A and 4B, when the cover plate 110 is in the closed position, the cover plate 110 is located in the housing opening 109 to close the housing opening 109, and the cover plate 110 is substantially in a vertical state. The limiting pin 122 of the cover plate 110 is at the lowermost end of the lower right of the track slot 106. At this time, the connecting block 123 of the cover plate 110 is at the lowermost end.

When the driving gear 118 drives the transmission gear 119 to rotate clockwise, the transmission gear 119 rotates the rotating shaft 128 and the connecting member 127 clockwise together to enable the connecting block 123 on the top end of the cover plate 110 to move circumferentially to the upper left. At this time, the limiting pin 122 of the cover plate 110 slides to the upper left in the track slot 106, so as to limit the movement of the bottom end of the cover plate 110 to the upper left and enable the top end of the cover plate 110 to tilt to the left. Until the cover plate 110 reaches the state shown in FIGS. 5A and 5B, the cover plate 110 begins to enter the accommodating cavity 481 through the receiving channel 482.

Figure 5A:
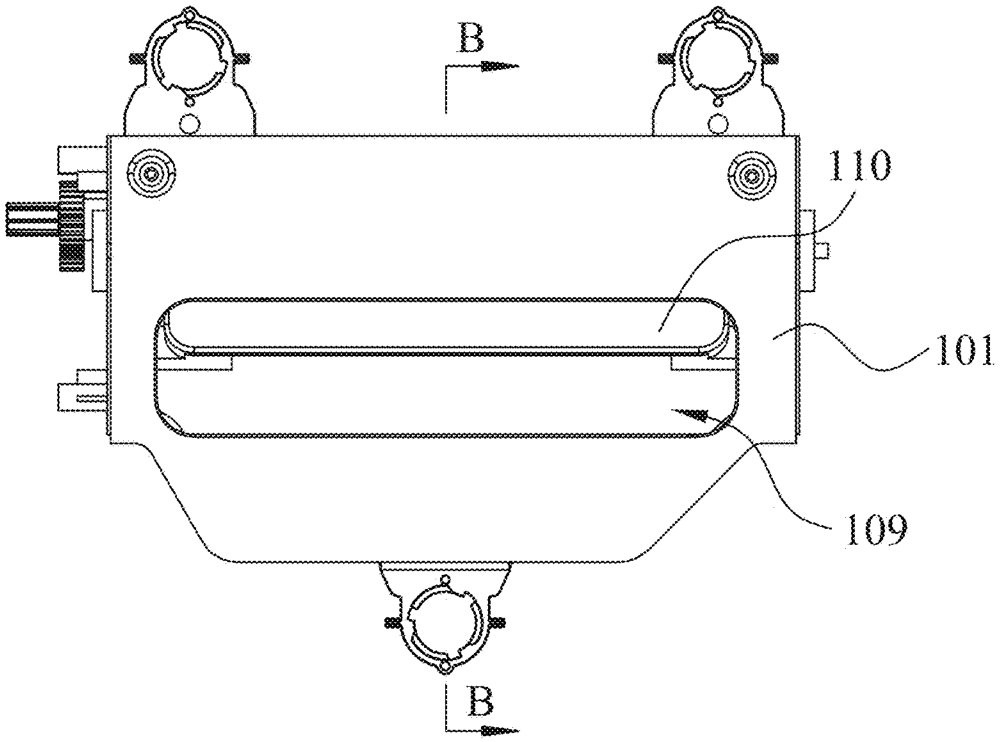
FIG. 5A is a front view of the handle assembly when the cover plate is in the intermediate position.
Figure 5B:
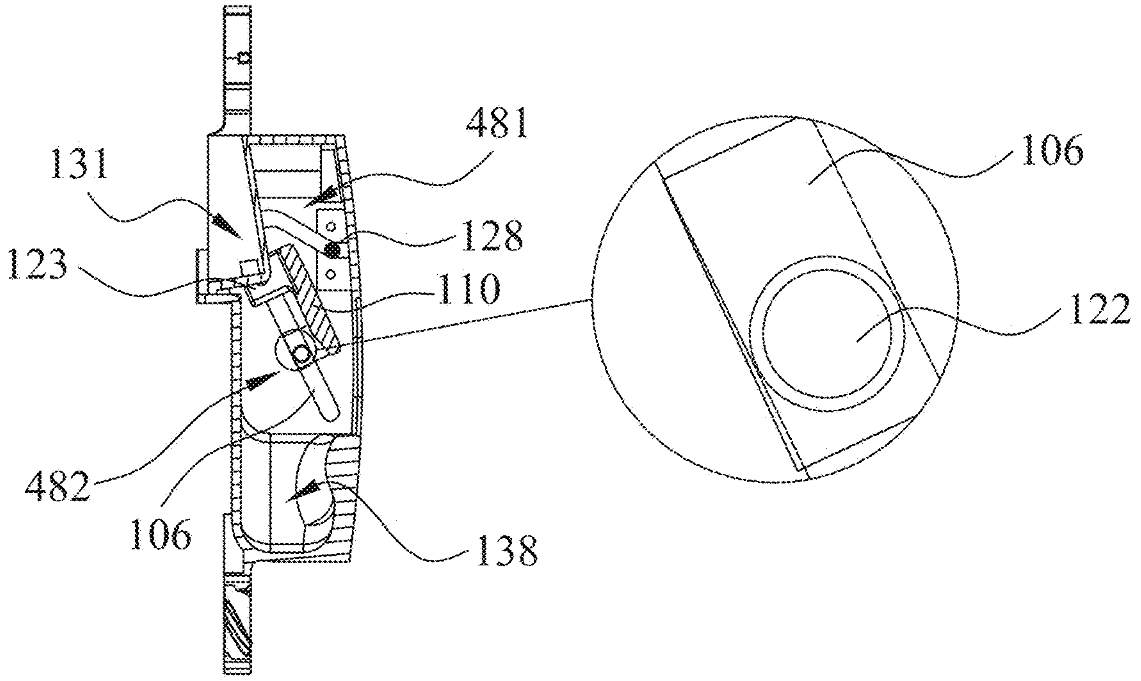
FIG. 5B is a cross-sectional view of the handle assembly shown in FIG. 5A taken along line B-B.

FIGS. 5A and 5B show the structure of the handle assembly 100 when the cover plate 110 is in the intermediate position. FIG. 5A shows a front view of the handle assembly 100, and FIG. 5B shows a cross-sectional view of the handle assembly 100 shown in FIG. 5A along line B-B, with a dashed box showing a partial enlarged view. As shown in FIGS. 5A and 5B, when the cover plate 110 is in the intermediate position, the cover plate 110 begins to enter the accommodating cavity 481. The limiting pin 122 of the cover plate 110 is in the middle of the track slot 106. At this time, the connecting block 123 of the cover plate 110 is at the leftmost end.

When the driving gear 118 continues to drive the transmission gear 119 to rotate clockwise, the transmission gear 119 continues to rotate the rotating shaft 128 and the connecting member 127 clockwise together to enable the connecting block 123 on the top end of the cover plate 110 to move circumferentially to the upper right. At this time, the limiting pin 122 of the cover plate 110 continues to slide to the upper left in the track slot 106, so as to limit the bottom end of the cover plate 110 from continuing to move to the upper left and enable the top end of the cover plate 110 to tilt to the right to return to the vertical state. Until the cover plate 110 reaches the state shown in FIGS. 6A and 6B, the cover plate 110 reaches the open position, and the cover plate 110 completely enters the accommodating cavity 481.

Figure 6A:
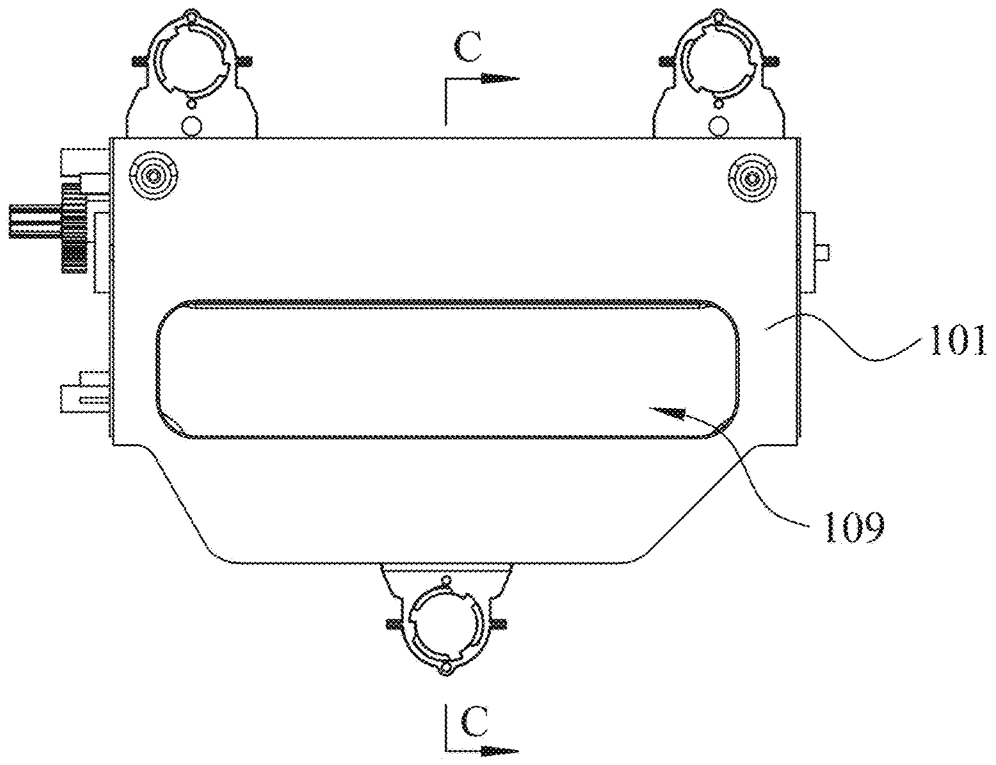
FIG. 6A is a front view of the handle assembly when the cover plate is in the open position.
Figure 6B:
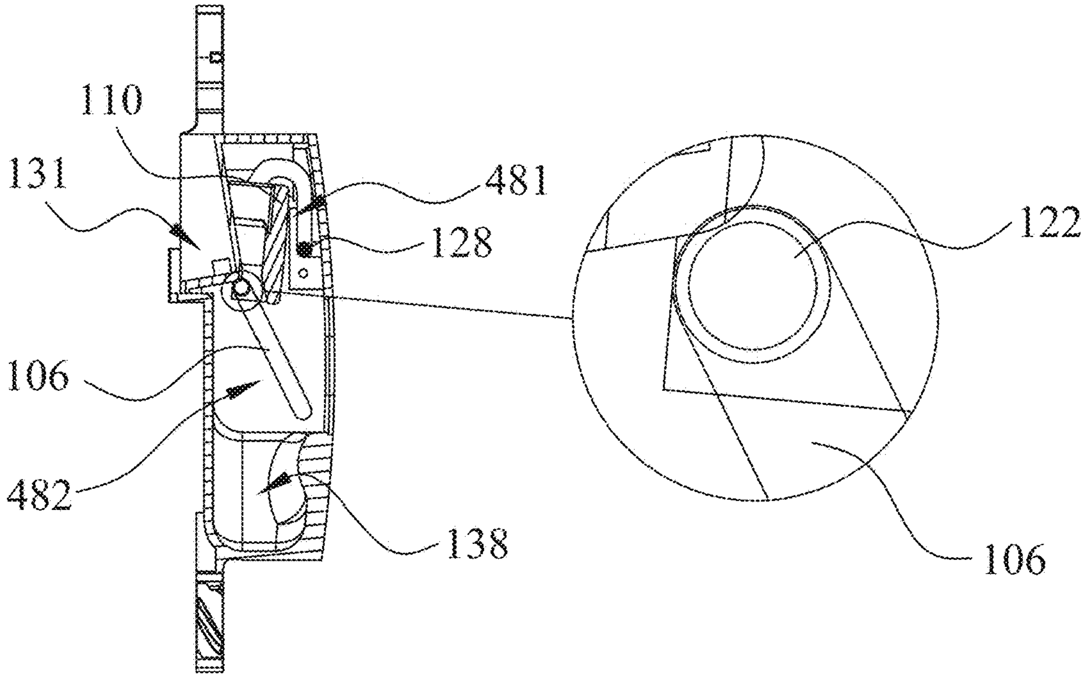
FIG. 6B is a cross-sectional view of the handle assembly shown in FIG. 6A taken along line C-C.

FIGS. 6A and 6B show the structure of the handle assembly 100 when the cover plate 110 is in the open position. FIG. 6A shows a front view of the handle assembly 100, and FIG. 6B shows a cross-sectional view of the handle assembly 100 shown in FIG. 6A along line C-C, with a dashed box showing a partial enlarged view. As shown in FIGS. 6A and 6B, when the cover plate 110 is in the open position, the housing opening 109 is exposed, and the cover plate 110 is located in the accommodating cavity 481. When viewed from the outer side of the handle assembly 100 (i.e., from the right side in FIG. 6B), the cover plate 110 can be completely obscured by the housing 101. The limiting pin 122 of the cover plate 110 is at the top of the track slot 106. The connecting block 123 of the cover plate 110 is at the uppermost end.

When the cover plate 110 is in the open position, the operator's hand can access the operating cavity 138 below the receiving channel 482 through the housing opening 109 to perform desired operations on the operating element in the operating cavity 138, for example, to be detected by the sensing device 133. Since the cover plate 110 is located in the accommodating cavity 481 above the receiving channel 482, the cover plate 110 does not block the operator's hand, making it easier for the operator to operate.

When the cover plate 110 needs to be closed, the driving gear 118 rotates the transmission gear 119 counterclockwise, and the cover plate 110 moves from the open position shown in FIGS. 6A and 6B, passes over the intermediate position shown in FIGS. 5A and 5B, and then reaches the closed position shown in FIGS. 4A and 4B.

In some special cases such as where the driving gear 118 cannot be rotated normally by the motor 108, when the cover plate 110 in the closed position needs to be opened, the operator may also press directly on the top end of the cover plate 110 to move the top end of the cover plate 110 to the left and then drive the connecting member 127 and the rotating shaft 128 to rotate and in turn move the cover plate 110 from the closed position as shown in FIGS. 4A and 4B to the intermediate position as shown in FIGS. 5A and 5B. The operator then applies an upwardly lifting force to the bottom end of the cover plate 110, and after the top end of the cover plate 110 receives the force, the connecting member 127 and the rotating shaft 128 are driven to continue to rotate until the cover plate 110 is completely opened, reaching the open position shown in FIGS. 6A and 6B.

Figure 7:
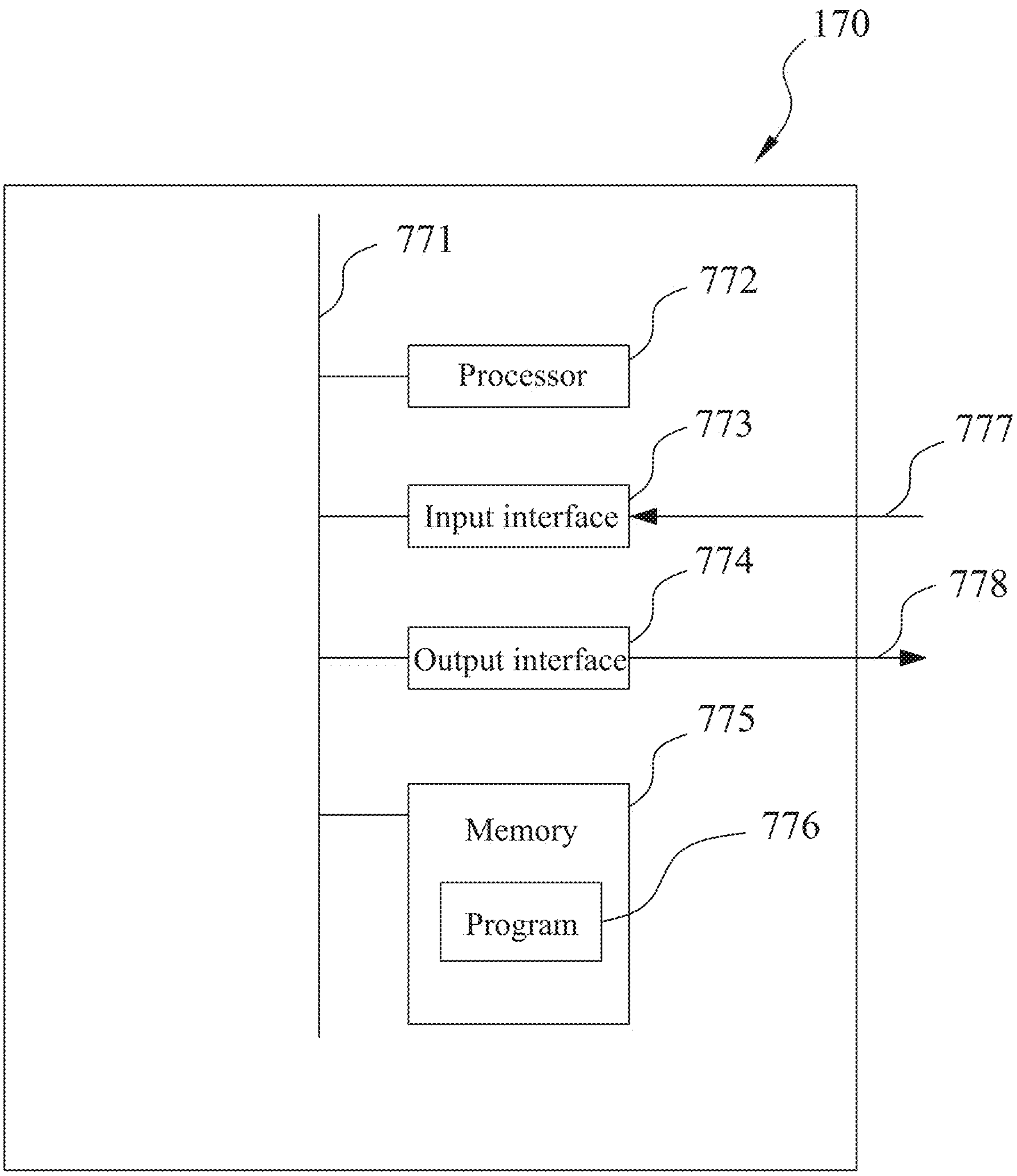
FIG. 7 is a schematic diagram of a structure of a controller.

FIG. 7 shows the structure of the controller 170. The controller 170 is configured to control the handle assembly 100. The controller 170 includes a bus 771, a processor 772, an input interface 773, an output interface 774, and a memory 775 that stores control programs 776. The components in the controller 170, including the processor 772, the input interface 773, the output interface 774 and the memory 775, are communicatively connected to the bus 771, so that the processor 772 can control operations of the input interface 773, the output interface 774 and the memory 775. Specifically, the memory 775 is configured to store programs, instructions and data, and the processor 772 reads the programs, instructions and data from the memory 775 and can write data to the memory 775. The processor 772 controls operations of the input interface 773 and the output interface 774 by executing the programs and the instructions read from the memory 775.

The input interface 773 is communicatively connected to the sensing device 133 via a connection 777, and is configured to receive internal control signals and external control signals from the sensing device 133 and receive an instruction from the operation panel in the vehicle and to store the control signals and the instruction to the memory 775. The output interface 774 is communicatively connected to the motor 108 and the vehicle door via a connection 778, and by means of executing the program 776 in the memory 775, the controller 170 controls the position of the cover plate 110 of the handle assembly 100 by means of the motor 108, and controls the locking and unlocking of the vehicle door.

In some examples, the program 776 is configured such that, when the cover plate 110 is in the closed position, the controller 170 controls the cover plate 110 to move to the open position after receiving an external control signal. Also, when the cover plate 110 is in the open position, the controller 170 controls the cover plate 110 to move to the closed position after receiving an external control signal or after the absence of the signal lasts for a predetermined time.

In addition, in some examples, the program 776 is configured such that, when the controller 170 receives an internal control signal, the controller 170 controls the door 660 of the vehicle to be unlocked for the operator to open the door 660. When the door 660 is in a closed and unlocked state, and after the controller 170 receives an external control signal or after the absence of the signal lasts for a predetermined time, the controller 170 controls the door 660 to be locked.

Figure 8A:
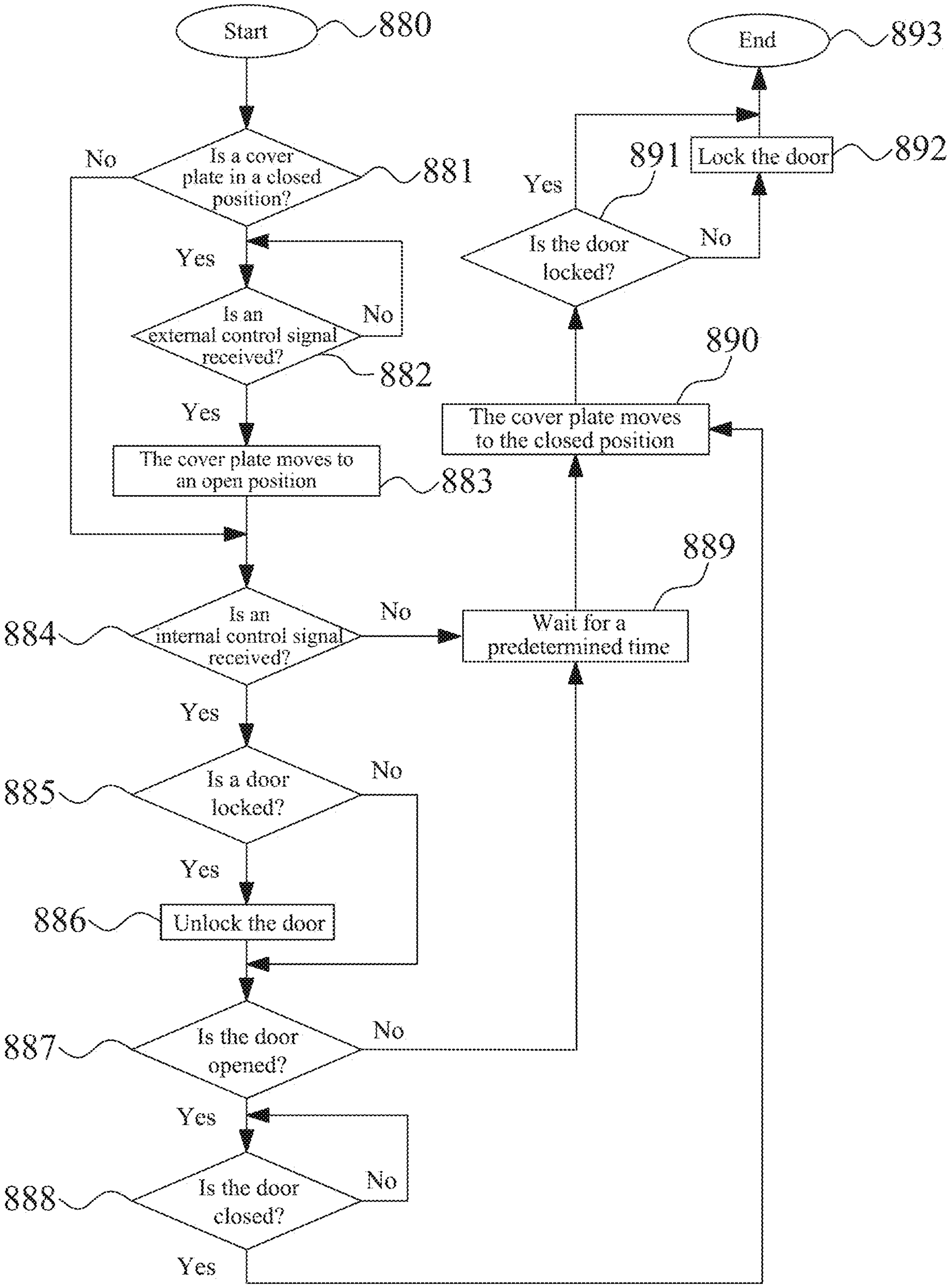
FIG. 8A is a flow chart showing an operator getting on a vehicle.
Figure 8B:
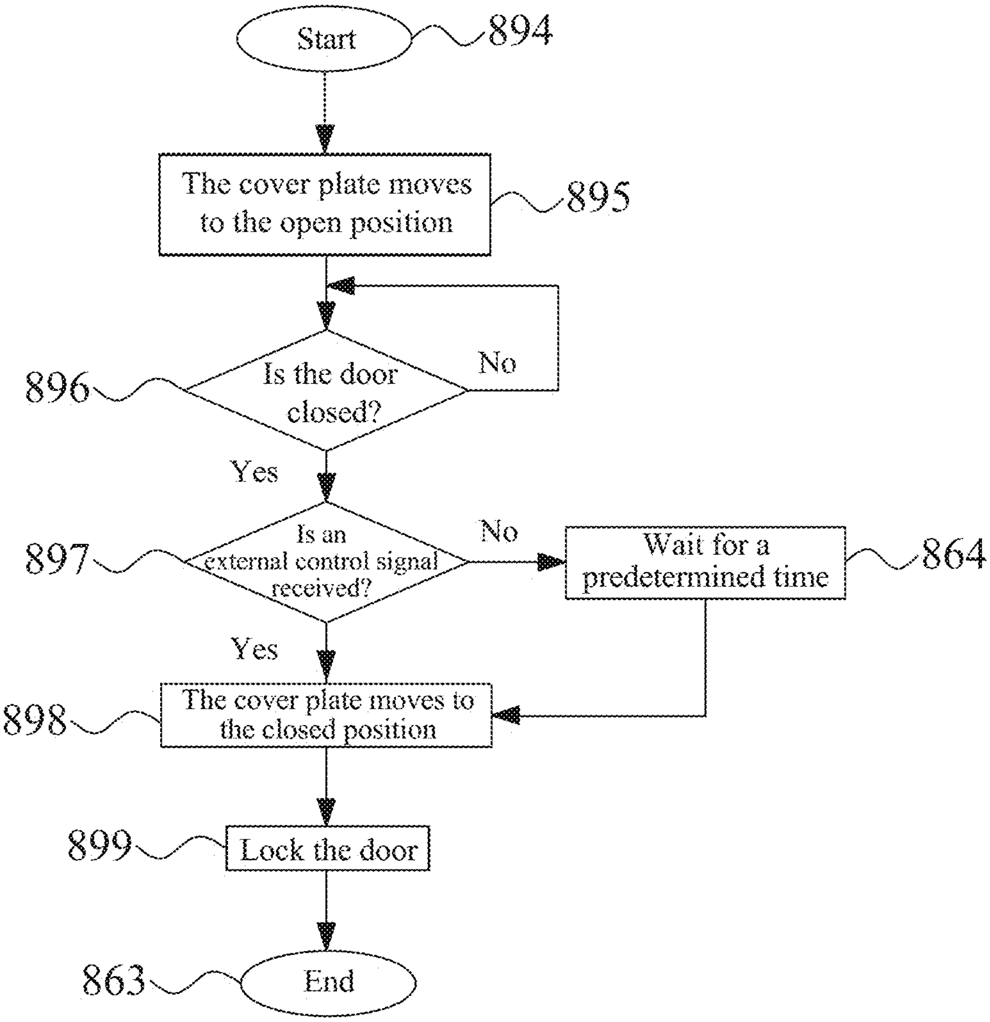
FIG. 8B is a flow chart showing the operator getting off the vehicle.

FIGS. 8A and 8B show control program flow charts according to some specific examples of the handle system. FIG. 8A shows a control program flow chart of a procedure of a person getting on a vehicle from the outside of the vehicle, and FIG. 8B shows a control program flow chart of a procedure of the person getting off the vehicle.

As shown in FIG. 8A, when the vehicle detects that a vehicle key is close to a preset position of the vehicle, the controller 170 controls the program to start at step 880 and executes step 881.

At step 881, the controller 170 determines whether the cover plate 110 is in a closed position, and if so, executes step 882, otherwise executes step 884.

At step 882, the controller 170 determines whether an external control signal is received, and if so, executes step 883, otherwise returns to step 882.

At step 883, the controller 170 controls the motor 108 to move the cover plate 110 to the open position, so that the operator's hand can access the operating cavity 138 for operation. The controller 170 then executes step 884.

At step 884, the controller 170 determines whether an internal control signal is received, and if so, executes step 885, otherwise executes step 889.

At step 885, the controller 170 determines whether the vehicle door is locked, and if so, executes step 886, otherwise executes step 887.

At step 886, the controller 170 controls the vehicle door to be unlocked, so that the operator can open the vehicle door and enter the vehicle. The controller 170 then executes step 887.

At step 887, the controller 170 determines whether the vehicle door is opened, and if so, executes step 888, otherwise executes step 889.

At step 888, the controller 170 determines whether the vehicle door is closed, and if so, executes step 890, otherwise executes step 888.

At step 889, the controller 170 waits for a predetermined time and then executes step 890.

At step 890, the controller 170 controls the motor 108 to move the cover plate 110 to the closed position and then executes step 891.

At step 891, the controller 170 continues to determine whether the door is locked, and if so, executes step 893, otherwise executes step 892.

At step 892, the controller 170 controls the vehicle door to be locked and then executes step 893.

At step 893, the program ends.

As shown in FIG. 8B, when the controller 170 receives a corresponding instruction from the operation panel in the vehicle, the controller 170 controls the program to start at step 894 and executes step 895.

At step 895, the controller 170 controls the motor 108 to move the cover plate 110 to the open position and then executes step 896.

At step 896, the controller 170 determines whether the vehicle door is closed, and if so, executes step 897, otherwise executes step 896.

At step 897, the controller 170 determines whether an external control signal is received, and if so, executes step 898, otherwise executes step 864.

At step 864, the controller 170 waits for a predetermined time and then executes step 898.

At step 898, the controller 170 controls the motor 108 to move the cover plate 110 to the closed position and then executes step 899.

At step 899, the controller 170 controls the vehicle door to be locked and then executes step 863.

At step 863, the program ends.

In the handle assembly of the present disclosure, when the cover plate is in the open position, the cover plate and the operating element are respectively located in the accommodating cavity and the operating cavity, so that the cover plate does not block the operator's hand from operating the operating element, preventing the operator's hand from hitting the cover plate. Also, when the cover plate is in the open position, the housing can also cover the cover plate and the transmission device which are located at the rear side, making the door have a more artistic appearance.

In the handle system of the present disclosure, the cover plate is driven by the motor to move, so that the handle assembly can be electrically connected to the controller, and thus the cover plate can be automatically opened or closed by means of the controller. In addition, the motor-driven handle assembly of the present disclosure also eliminates the possible interference from external factors when the cover plate is driven by a mechanical device to move, for example, eliminates the possibility of the operator's hand being pinched due to the cover plate returning to the closed position too quickly.

In the present disclosure, the transmission device performs transmission by means of the gear, the rotating shaft and the connecting member to enable the top end of the cover plate to move circumferentially. Also, the movement track of the cover plate is limited by means of the limiting pin and the track slot to enable the bottom end of the cover plate to move linearly along the inclined straight slot. Such a cover plate requires smaller movement space than a rotatable cover plate, when the cover plates have the same size. In this way, according to the handle assembly of the present disclosure, the handle assembly can have a smaller thickness. Also, in the present disclosure, the displacement of the rotating shaft is limited by the limiting structure, so that the rotating shaft can only rotate, thus preventing the cover plate from shaking due to the outside interference on the rotating shaft, and thus the cover plate of the present disclosure has good movement stability. Also, in the present disclosure, the transmission device has a simple structure, and makes the cover plate open and close quickly.

Also, in the present disclosure, by means of the transmission device, in an emergency situation, the operator can also press the cover plate from outside of the handle assembly to open the cover plate to enable the operator's hand to access the operating cavity for operation, thereby improving the reliability of the handle assembly.

In addition, the handle assembly of the present disclosure further includes an ultrasonic sensor as the sensing device. There is no need for the operator to directly touch the ultrasonic sensor, so that the detection result of the ultrasonic sensor will not be affected even if the operator's hand is wet. Also, since the ultrasonic sensor has the characteristics of penetrating metal and plastic materials, the handle assembly of the present disclosure has no requirement on the material and thickness of the handle assembly and the vehicle door and also has no requirement on the spray paint, even the surface of a door made of metal and the surface of a paint-coated door with a high conductivity will not affect the signal collection of the ultrasonic sensor, and there will be no false triggering when a metal object approaches. In addition, the ultrasonic sensor performs signal collection and calculation by means of a chip integrated with the sensor, without the need for additional processing chip.

Although the present disclosure is described with reference to the examples of examples outlined above, various alternatives, modifications, variations, improvements and/or substantial equivalents, which are known or anticipated at present or to be anticipated before long, may be obvious to those of at least ordinary skill in the art. Accordingly, the examples of the examples of the present disclosure as set forth above are intended to be illustrative rather than limiting. Various changes may be made without departing from the spirit or scope of the present disclosure. Therefore, the present disclosure is intended to embrace all known or earlier disclosed alternatives, modifications, variations, improvements and/or substantial equivalents. The technical effects and technical problems in this specification are exemplary rather than limiting. It should be noted that the examples described in this specification may have other technical effects and can solve other technical problems.

What is claimed is:

1. A handle assembly for a door having a handle aperture, comprising:

a housing defining a cavity and having a housing opening in communication with the cavity, and the housing opening being configured to be aligned with the handle aperture of the door;

a cover plate having a closed position and an open position, and the cover plate being configured to close the handle aperture of the door in the closed position and to open the handle aperture of the door in the open position;

a transmission device disposed in the housing and connected to the cover plate, wherein the transmission device is configured to move the cover plate between the closed position and the open position in response to an electronic signal and, when the cover plate is in the closed position, move the cover plate to the open position by a pushing force from outside of the cover plate, wherein the transmission device comprises a rotating shaft configured to rotate in response to an electronic signal or a mechanical force, wherein the rotating shaft extends along an entire length of the cover plate;

at least one connecting member, and one end of the at least one connecting member is connected to the rotating shaft to rotate with rotation of the rotating shaft, and the other end of the at least one connecting member is rigidly hinged to the cover plate to enable the rotating shaft to move the cover plate by means of the connecting member or enable the cover plate to rotate the rotating shaft by means of the connecting member;

a limiting structure disposed on the cover plate and a corresponding limiting fit structure disposed on the housing, the limiting structure being engaged with the limiting fit structure;

wherein the transmission device, the limiting structure, and the limiting fit structure cooperate to guide movement of the cover plate between the closed position and the open position;

wherein the limiting structure is disposed at a bottom portion of the cover plate;

wherein the limiting structure comprises at least one limiting pin disposed at at least one end of the cover plate in a left-right direction, and the limiting fit structure comprises a track slot formed in a side wall of the housing, the at least one limiting pin being slidably received in the track slot; and wherein the track slot is a straight slot extending obliquely upward in a front-rear direction.

2. The handle assembly according to claim 1, wherein the at least one connecting member is hinged to a top end of the cover plate to enable the top end of the cover plate to rotate circumferentially around the rotating shaft.

3. The handle assembly according to claim 1, wherein the transmission device further comprises a driving gear and a transmission gear meshing with each other, and the transmission gear is in transmission connection between the rotating shaft and the driving gear, so that the rotation of either of the driving gear and the rotating shaft is capable of driving the transmission gear to rotate, and in turn the transmission gear drives the other one of the rotating shaft and the driving gear to rotate;

wherein the driving gear and the transmission gear are configured such that, in response to an electronic signal, the driving gear is driven by a motor to rotate so as to rotate the transmission gear and in turn move the cover plate by means of the connecting member; and, in response to a pushing force from outside of the cover plate, the cover plate rotates the rotating shaft by means of the connecting member so as to rotate the transmission gear and in turn drive the driving gear to rotate.

4. The handle assembly according to claim 3, wherein the diameter of the driving gear is greater than the diameter of the transmission gear.

5. The handle assembly according to claim 1, wherein the cavity comprises an accommodating cavity, a receiving channel and an operating cavity, wherein the receiving channel is located at a rear side of the housing opening, and the accommodating cavity and the operating cavity are respectively located at the opposite upper side and lower side of the receiving channel and interconnected to each other through the receiving channel; and wherein the accommodating cavity of the housing is configured to accommodate the cover plate when the cover plate is in the open position, and the operating cavity of the housing is configured to at least partially accommodate an operator's hand for opening the door.

6. The handle assembly according to claim 5, wherein the handle assembly further comprise an operating element comprising a sensing device configured to detect the operator's hand and to send a signal.

7. The handle assembly according to claim 6, wherein the sensing device is disposed on a side wall of the housing close to the housing opening to allow the operator's hand to access the operating cavity from the housing opening through the receiving channel so as to be detected by the sensing device.

8. The handle assembly of claim 3, wherein the rotating shaft extends axially from the transmission gear.

9. A handle assembly for a door having a handle aperture, comprising:

a housing defining a cavity and having a housing opening in communication with the cavity, and the housing opening configured to be aligned with the handle aperture of the door;

a cover plate having a closed position and an open position, and the cover plate configured to close the handle aperture of the door in the closed position and to open the handle aperture of the door in the open position;

a transmission device disposed in the housing and connected to the cover plate, wherein the transmission device is configured to move the cover plate between the closed position and the open position in response to an electronic signal and, when the cover plate is in the closed position, and move the cover plate to the open position by a pushing force from outside of the cover plate; and a limiting structure disposed on the cover plate; and a limiting fit structure disposed on the housing, wherein the limiting structure is engaged with the limiting fit structure, wherein the transmission device, the limiting structure and the limiting fit structure enable the cover plate to move between the closed position and the open position, wherein the limiting fit structure comprises a track slot formed on a side wall of the housing, and the limiting pin is configured to slide in the track slot, and wherein the track slot is a straight slot, and the track slot extends obliquely upward in a front-rear direction.

10. The handle assembly according to claim 9, wherein the transmission device comprises a rotating shaft being capable of rotating in response to an electronic signal or a mechanical force and at least one connecting member, and one end of the at least one connecting member is connected to the rotating shaft to rotate with rotation of the rotating shaft, and the other end of the at least one connecting member is rigidly hinged to the cover plate to enable the rotating shaft to move the cover plate by means of the connecting member or enable the cover plate to rotate the rotating shaft by means of the connecting member.

11. The handle assembly according to claim 10, wherein the at least one connecting member is hinged to a top end of the cover plate to enable the top end of the cover plate to rotate circumferentially around the rotating shaft.

12. The handle assembly according to claim 10, wherein the limiting structure on the cover plate is disposed at the bottom of the cover plate.

13. The handle assembly according to claim 10, wherein the at least one connecting member is hinged to enable the top end of the cover plate to rotate circumferentially around the rotating shaft.

14. The handle assembly according to claim 10, wherein the transmission device further comprises a driving gear and a transmission gear meshing with each other, and the transmission gear is in transmission connection between the rotating shaft and the driving gear, so that the rotation of either of the driving gear and the rotating shaft is capable of driving the transmission gear to rotate, and in turn the transmission gear drives the other one of the rotating shaft and the driving gear to rotate;

wherein the driving gear and the transmission gear are configured such that, in response to an electronic signal, the driving gear is driven by a motor to rotate so as to rotate the transmission gear and in turn move the cover plate by means of the connecting member; and, in response to a pushing force from outside of the cover plate, the cover plate rotates the rotating shaft by means of the connecting member so as to rotate the transmission gear and in turn drive the driving gear to rotate.

15. The handle assembly according to claim 14, wherein the diameter of the driving gear is greater than the diameter of the transmission gear.

16. The handle assembly according to claim 9, wherein the cavity comprises an accommodating cavity, a receiving channel and an operating cavity, wherein the receiving channel is located at a rear side of the housing opening, and the accommodating cavity and the operating cavity are respectively located at the opposite upper side and lower side of the receiving channel and interconnected to each other through the receiving channel; and wherein the accommodating cavity of the housing is configured to accommodate the cover plate when the cover plate is in the open position, and the operating cavity of the housing is configured to at least partially accommodate an operator's hand for opening the door.

17. A handle assembly for a door having a handle aperture, comprising:

a housing defining a cavity and having a housing opening in communication with the cavity, the housing opening being configured to align with the handle aperture of the door;

a cover plate movable between a closed position, in which the handle aperture is closed, and an open position, in which the handle aperture is open;

a transmission device disposed in the housing and operatively connected to the cover plate, the transmission device being configured to move the cover plate between the closed position and the open position in response to an electronic signal and, when the cover plate is in the closed position, to permit movement of the cover plate to the open position in response to a pushing force applied from outside the cover plate, the transmission device comprising:

a rotating shaft configured to rotate in response to an electronic signal or a mechanical force, the rotating shaft extending along an entire length of the cover plate;

a driving gear; and a transmission gear meshing with the driving gear and being in transmission connection between the rotating shaft and the driving gear, such that rotation of either the driving gear or the rotating shaft drives the transmission gear and thereby rotates the other of the driving gear and the rotating shaft, wherein the driving gear and the transmission gear are configured such that, in response to the electronic signal, the driving gear is driven by a motor to rotate the transmission gear and thereby move the cover plate, and, in response to the pushing force applied from outside the cover plate, the cover plate rotates the rotating shaft to rotate the transmission gear and thereby drive the driving gear;

at least one connecting member having a first end connected to the rotating shaft for rotation therewith and a second end rigidly hinged to the cover plate such that rotation of the rotating shaft moves the cover plate and movement of the cover plate rotates the rotating shaft; and a limiting structure disposed on the cover plate and a limiting fit structure disposed on the housing and engaged with the limiting structure, the transmission device, the limiting structure, and the limiting fit structure cooperating to guide movement of the cover plate between the closed position and the open position, wherein the rotating shaft extends axially from the transmission gear.

18. The handle assembly of claim 17, wherein the transmission device further comprises a driving gear and a transmission gear meshing with each other, the transmission gear being operatively connected between the rotating shaft and the driving gear such that rotation of either the driving gear or the rotating shaft drives the transmission gear and thereby rotates the other of the driving gear and the rotating shaft.

19. The handle assembly of claim 17, wherein the cavity comprises an accommodating cavity, a receiving channel, and an operating cavity, the receiving channel being located rearward of the housing opening, and the accommodating cavity and the operating cavity being disposed on opposite upper and lower sides of the receiving channel and in communication therewith, the accommodating cavity being configured to receive the cover plate in the open position and the operating cavity being configured to receive at least a portion of an operator's hand.

* * * * *